United States Patent [19]

Oda

[11] Patent Number: 5,703,932
[45] Date of Patent: Dec. 30, 1997

[54] CELLULAR TELEPHONE WITH BUILT-IN BATTERY AND ANTENNA

[75] Inventor: Teruo Oda, Gamagouri, Japan

[73] Assignee: Nippondenso Co., Ltd., Kariya, Japan

[21] Appl. No.: 396,435

[22] Filed: Feb. 28, 1995

[30] Foreign Application Priority Data

Feb. 28, 1994 [JP] Japan ............ 6-30059

[51] Int. Cl.⁶ ............................................. H04Q 7/20
[52] U.S. Cl. ............... 379/58; 379/355; 379/368; 379/428; 379/433; 455/89; 455/90
[58] Field of Search ............ 379/58, 368, 433, 379/428, 434, 355; 455/89, 90; D14/137, 138

[56] References Cited

U.S. PATENT DOCUMENTS

| | | | |
|---|---|---|---|
| D. 368,616 | 4/1996 | Oda et al. | D14/530 |
| 4,408,101 | 10/1983 | Brodbeck | 379/355 |
| 5,138,649 | 8/1992 | Krisberg et al. | 379/56 |
| 5,212,722 | 5/1993 | Murata | 379/58 |
| 5,303,288 | 4/1994 | Duffy et al. | 379/59 |
| 5,349,629 | 9/1994 | Kumano | 379/58 |
| 5,493,703 | 2/1996 | Yamashita | 455/89 |
| 5,535,258 | 7/1996 | Joglekar et al. | 379/58 |

FOREIGN PATENT DOCUMENTS

| | | |
|---|---|---|
| 3123596 | 1/1983 | Germany . |
| 52-4807 | 2/1977 | Japan . |
| 62-178047 | 8/1987 | Japan . |
| 4-86143 | 3/1992 | Japan . |

OTHER PUBLICATIONS

"Mail Merchants from JCPenny", Genuine Bell, USA Weekend, Arp. 1989.

*Primary Examiner*—Dwayne Bost
*Assistant Examiner*—Nay Maung
*Attorney, Agent, or Firm*—Cushman, Darby & Cushman IP Group of Pillsbury Madison & Sutro LLP

[57] ABSTRACT

A cellular telephone which is compact, slim in shape and convenient for the one touch signal transmission is disclosed. On the right hand side of the front surface of a case, numeral keys of 0 through 9 are provided in a row while, on the left hand side, function keys are provided in a row. That is, keys are aligned in the double row layout. On the rear surface of the case a slide switch which allows to set the one touch transmission mode is provided. At the center between the two rows of the keys, a groove, which runs longitudinally over the case, is provided for the ease of grip. A speaker and a microphone are provided in the groove portion. Further, small protrusions are formed on the front surface of the case to enable built-touch operation of the numeral keys.

7 Claims, 6 Drawing Sheets

FIG.1
FIG.4
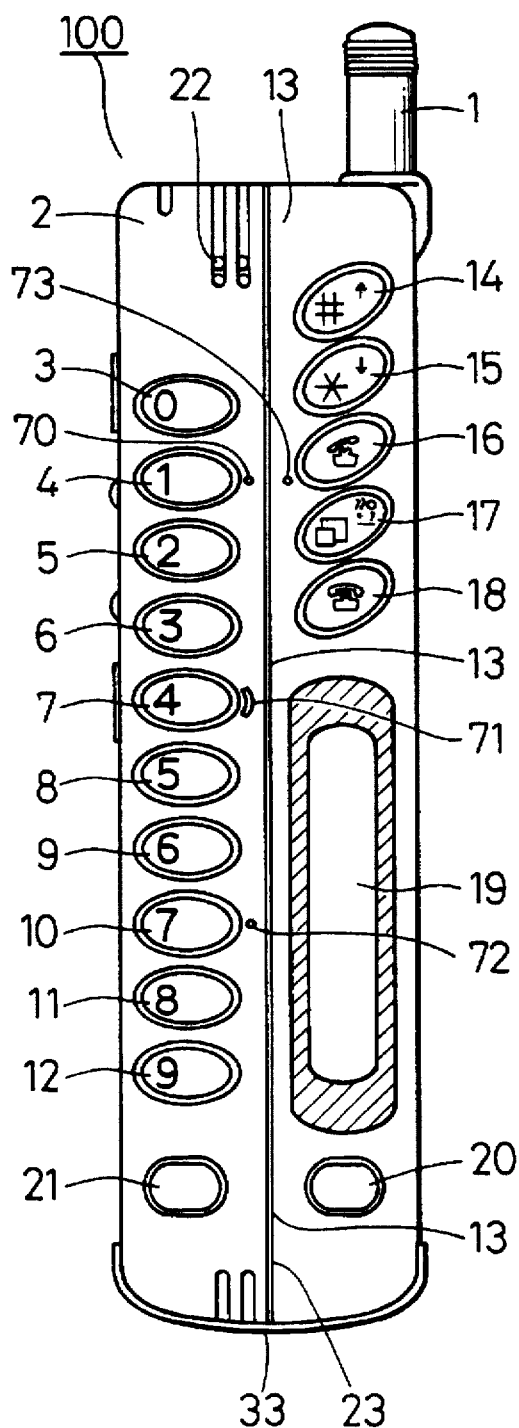
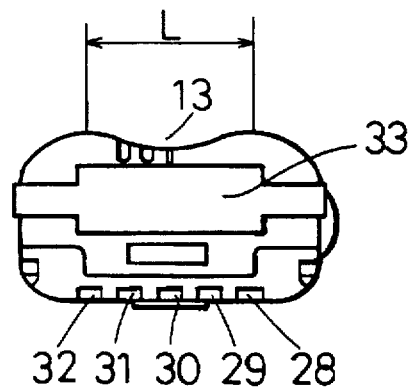

CELLULAR TELEPHONE WITH BUILT-IN BATTERY AND ANTENNA

CROSS REFERENCE TO RELATED APPLICATION

This application is based upon and claims priority of Japanese Patent Application No. 6-30059 filed Feb. 28, 1994, the content of which is incorporated herein by reference.

BACKGROUND OF THE INVENTION

1. Field of the Invention

The present invention relates to a portable cellular telephone having a built-in battery and antenna and allowing one touch operation by a hand.

2. Related Art

A conventional telephone which transmits signals or calls by one touch operation, has three push buttons, namely A, B and C on the front surface of the case, for example, so that the one touch signal transmission can be made by operating any of these push buttons. In addition to these push buttons for the one touch operation, there exist numeral keys of 0 through 9 in push button form.

Furthermore, these keys are arranged in three rows, which make the cellular telephone larger and difficult to put in one's pocket, etc.

The above-described cellular telephone, however, has a problem that, while the layout of keys or buttons in three rows enables one to mount many keys, the width of the case becomes larger. Although it therefore has been considered to reduce the number of rows of keys to two, it is necessary to reduce the number of operation keys. However, if it is attempted to enable the one touch signal transmission as well as the ordinary operation of numeral keys, there arises another problem that, if these keys are arranged in two rows, the length of the case becomes very long so that the cellular telephone may be slim but too long.

SUMMARY OF THE INVENTION

It is, therefore, a purpose of the present invention to provide a compact and slim cellular telephone which allows the one touch signal transmission and which, still having the layout of operation keys in two rows, can reduce the number of operation keys.

According to the present invention, a cellular telephone generally is equipped with a built-in battery and an antenna. It comprises a long, slender and generally oblong or rectangular case with its rear surface adapted to be placed on the palm when it is held by hand. An antenna protrudes from one end of the case. Operation keys are arranged in double rows along the longitudinal direction on the front surface of the case. A switch for the one touch signal transmission setting is provided on the rear surface side of the case at the vicinity of the antenna.

Preferably one of the one touch transmission setting switches is for the one touch transmission setting mode and the other is for the one touch transmission release mode.

Further, the operation keys provide, when the case is gripped by hand, e.g., the left hand, with the antenna positioned at the top or upright, the numeral keys of 0 through 9 on the row at the left hand thumb side (the left hand side) and a plural number of function keys, which include at least the transmission and the termination keys on the other row at the right hand side.

Furthermore, the function keys are provided as a row of push button switches in the oblique shape with the right hand side at the top and are provided at the portion close to the antenna on the front surface side of the case.

According to the construction, if the slender case is gripped by, the left hand for instance, and the one touch transmission setting is established using the one touch setting switch provided on the rear face side of the case, it becomes possible to transmit signals by one touch to a desired address by just operating either one of operation keys provided on the front side of the case. Further, since the operation keys are arranged in double rows, the shape of the case becomes slim and it can be easily put in a pocket, etc.

In addition, since the one touch transmission setting switch is provided, no dedicated one touch keys are necessary so that the same keys can be used for both the numeral keys as the one touch keys. As a result, it becomes possible to make relatively short the overall size in the longitudinal direction of the case even though the operation keys are arranged in double rows.

It becomes possible also, by providing the numeral keys of 0 through 9 on the row at one side, e.g., left hand side, to install the function keys such as for the transmission, talk or call termination and the like on the other row at the other side, e.g., the left hand side. As a result, it becomes easier to operate the function keys on the cellular telephone which is generally operated by the left hand, and the key operation for the one touch transmission. In other words, in the light of frequent use of the function keys, these keys can be arranged at the right hand side row which is closer to the antenna.

In addition, since the function keys on the right side have the elliptic shape with the left hand side thereof at the top, they ideally match the shape and gripping direction of finger ends of left hand, thus providing an additional merit of easier operation.

Thus, it will become possible to present a cellular telephone which is compact, slim and convenient for the one touch transmission. It means that it is possible to reduce the dimensions both in the longitudinal and in the cross directions despite its double row layout, and to present a cellular telephone which can be stored easily and have a reduced number of operation keys as a whole despite the number of the one touch transmission keys.

BRIEF DESCRIPTION OF THE DRAWINGS

In the accompanying drawings:

FIG. 1 is a front view showing a cellular telephone according to an embodiment of the present invention;

FIG. 4 is a bottom view of the cellular telephone of the embodiment;

DETAILED DESCRIPTION OF THE EMBODIMENTS

Figure 2:
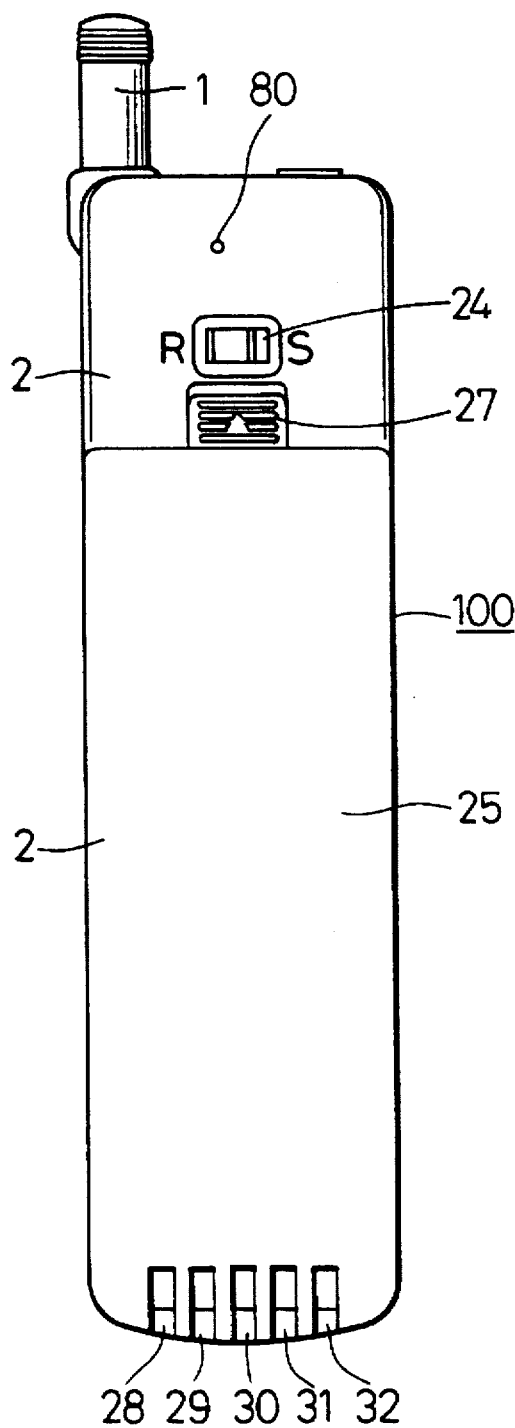
FIG. 2 is a rear view showing the cellular telephone of the embodiment.

Hereinafter the present invention will be explained with reference to the embodiments shown in the accompanying drawings.

In FIG. 1 showing the first embodiment of the present invention, an antenna 1 is provided extendably from top end of a case 2 of a cellular telephone 100. Numeral keys or numerical keys in push button form 3 through 12 with numerals 0 through 9 thereon are arranged in a row at the left hand side of the front side of the case 2.

As shown in FIG. 4, a shallow groove 13 is formed at the center of the front surface of the case 2 and the function keys 14 through 18 in the push button form are arranged at the right hand side of the groove 13. A display panel 19 utilizing a liquid crystal display and, in the operation mode for example, the one touch mode, the message indicating it is the one touch mode is shown thereon and, if the numerical keys 3 through 12 are operated, the telephone number of the destination is displayed thereon.

A power source key 20 and a function key 21 which is used for the mode setting or the confirmation of status are also provided on the front surface. A speaker 22 is provided at the top in the groove 13 shown in FIG. 4. In other words, it exists within the area indicated by the width L in FIG. 4.

A microphone 23 which is a condenser microphone is provided under the section on the front surface of the case 2 in the longitudinal groove 13, which is perforated with small holes. A switch 16 operated for the transmission and a switch 18 used for the termination of talk are also provided at the right side.

As shown in FIG. 2, on the rear face side of the case, at the antenna side at one end of the case 2, a slide switch 24 used to set the one touch call transmission is provided. If this slide switch 24 is slid to the right hand side in the figure, the one touch transmission is set while, if it is slid to the left hand side, the one touch transmission is released. A hole 80 is formed to provide the call buzzer sound.

Figure 3:
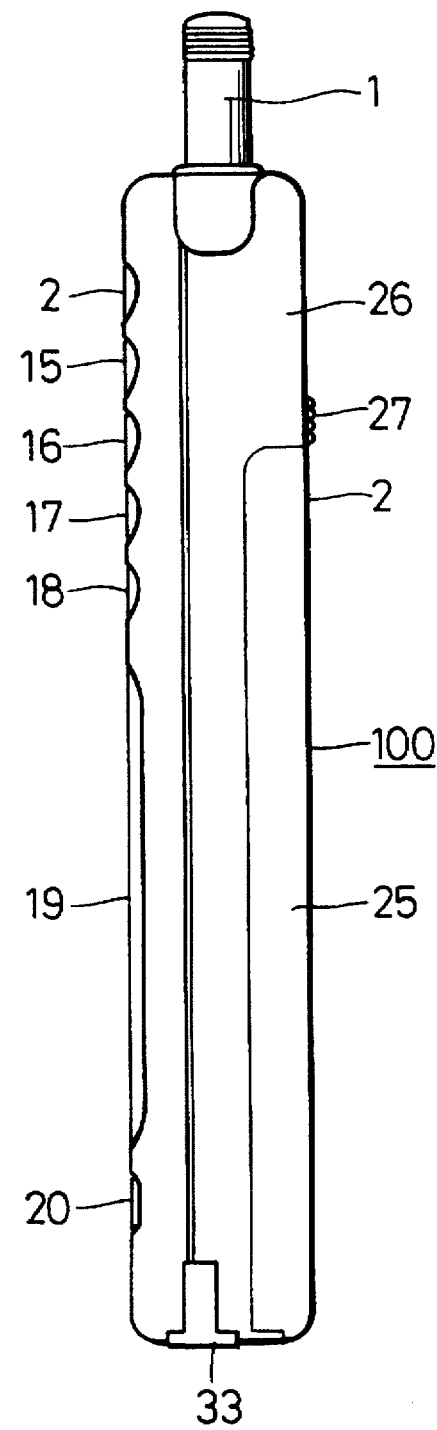
FIG. 3 is a right side view showing the cellular telephone of the embodiment.

A battery of which the outer surface is made of plastics and, when it is installed detachably as shown in FIGS. 2 and 3, it composes and integral structure together with the case 2. It should be noted that the battery 25 can be removed from the main unit side 26 by sliding a stopper 27 upward. The stopper 27 is so designed to protrude rearwardly slightly above the rear surface of the case 2 as shown in FIG. 3 so that the call buzzer sound holes 80 will not be sealed by it.

It should be noted that, in the present embodiment, both the rear face and the side surface of the battery 25 form a part of the case 2 of the cellular telephone 100. Further, exposed electrodes 28 through 32 to charge the battery 25 are provided at the lower or bottom end of the battery 25 which is opposite to the antenna 1. Moreover, at the bottom end of the case 2, the connector 33 is provided and a rubber cover is inserted in the section when the connector 33 is not connected.

In operation the case 2 is generally held by the left hand of an operator and, when the one touch transmission is to be made, the one touch transmission setting switch 24 is slid to the right hand side in FIG. 2 and either one of the numeral keys 3 through 12 in FIG. 1 are pushed. In this way, a call to a person or address previously registered in correspondence to the numeral keys can be made in the known manner.

In the ordinary transmission by the operation of numeral keys, a ten-digit number is entered by pressing the numeral keys 3 through 12 sequentially and the function key 16 for transmission is operated to establish the connection with the person or address to be called. After the connection, if the called person picks up a receiver, the communication starts and, if the function key 18 for the termination of talk is operated when the talk is over, the communication is terminated.

The function keys 14 through 18, which have various known functions, are in the form of push button switches in the elliptic shape with the right hand side thereof at the top and, in this way, the direction of finger tips is matched with the inclination of such push buttons when the telephone 100 is grabbed with the left hand so that they can be operated easily.

As shown in FIG. 1 and FIG. 4, since the shallow groove 13 is provided running from the top end of the case 2 to the bottom end in the longitudinal direction and the speaker 22 and the microphone 23 are provided within the width L so that the groove section functions also as the groove for sound concentration and the groove 13 produces not only the ease of grip when the case 2 is held by the hand, but also the advantage that the positions of button switches arranged at both sides of the groove 13 can be recognized easily because the operation keys arranged in the double rows on the hilly surfaces beside the groove 13 are separated to the right and to the left over the groove 13.

According to the foregoing embodiment, as shown in FIG. 1, four small protrusions 70, 71, 72 and 73 are provided on the groove 13 at the right hand side of the numeral keys 3 through 12. Among these, 70, 71 and 72 particularly are aligned longitudinally in a row along the groove 13 and extend from one of these numeral keys to the other end. Further, the small protrusion 71 positioned at the longitudinal center is different in shape from those of the small protrusions 70 and 72 so that the difference can be recognized by the difference of finger touch. This arrangement allows the blind touch operation of the keys without seeing the numbers on the keys 3 through 12. In particular, although the keys are arranged in a vertical row, these vertical keys can be operated by the blind touch because three small protrusions 70, 71, and 72 are arranged in the vertical row and the central protrusion 71 is given with a different shape from the other two protrusions 70 and 72.

The above embodiment is directed to the cellular telephone as an independent unit, however, it may be used in the compartment of an automobile or vehicle as described next as the second embodiment.

Figure 5:
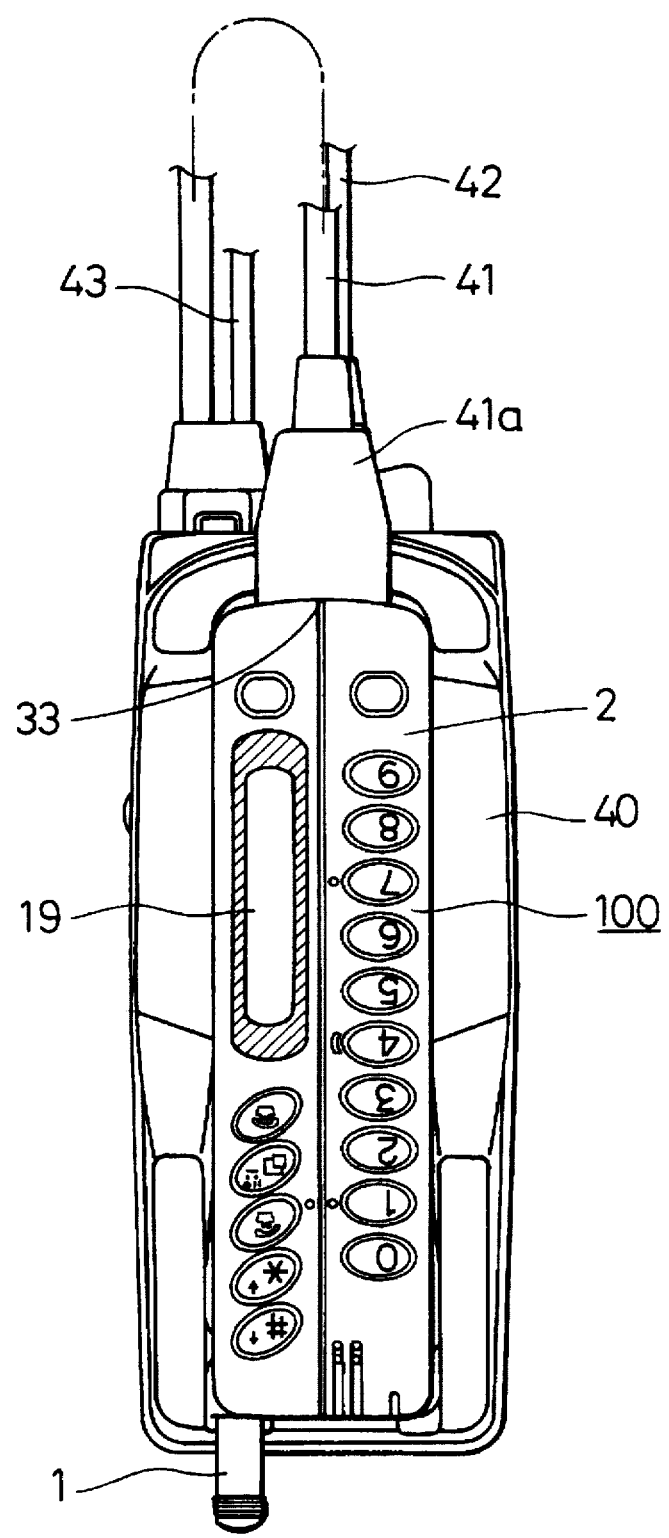
FIG. 5 is a front view showing the cellular telephone of the embodiment as it is placed on a cradle in the compartment of an automobile.
Figure 6:
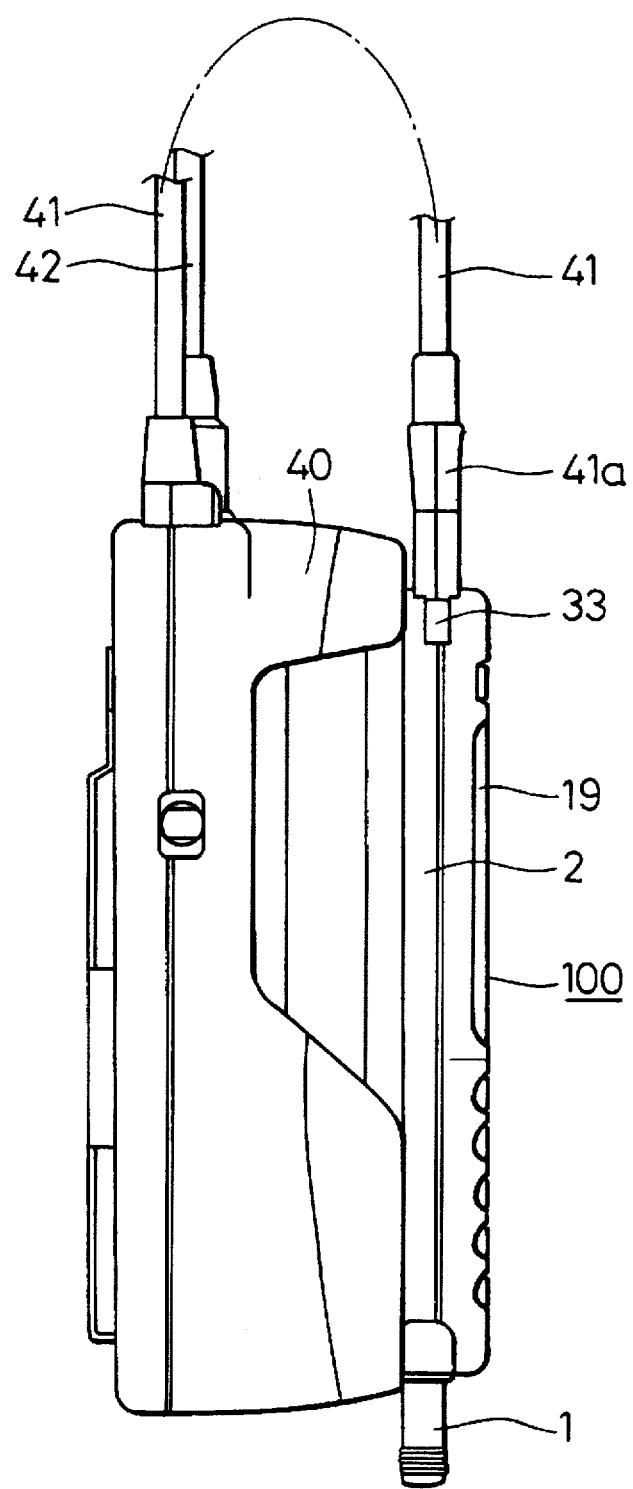
FIG. 6 is a left side view of the embodiment in the installed position in FIG. 5.

In FIG. 5 and FIG. 6, a cradle 40 which is installed in the automobile and the case 2 of a cellular telephone 100 are mounted on it. A cable 41 which connects the cradle 40 and the cellular telephone 100 and a connector 41a of the cable 41 can be connected with the rubber cover of the connector 33 in FIG. 3 being removed. It should be noted that FIGS. 5 and 6 show the vehicle antenna connection mode in which the cellular telephone 100 and the cradle 40 are connected with the cable 41 while, in the independent mode which is referred to later, the cable 41 is not connected but the case 2 of the cellular telephone 100 is just placed on the cradle 40. A power cable 42 supplies the vehicle's battery power to the cradle 40. A power cable 43 conducts electric power from the cradle 40 to the vehicle's antenna which protrudes to the outside of the vehicle.

Figure 7:
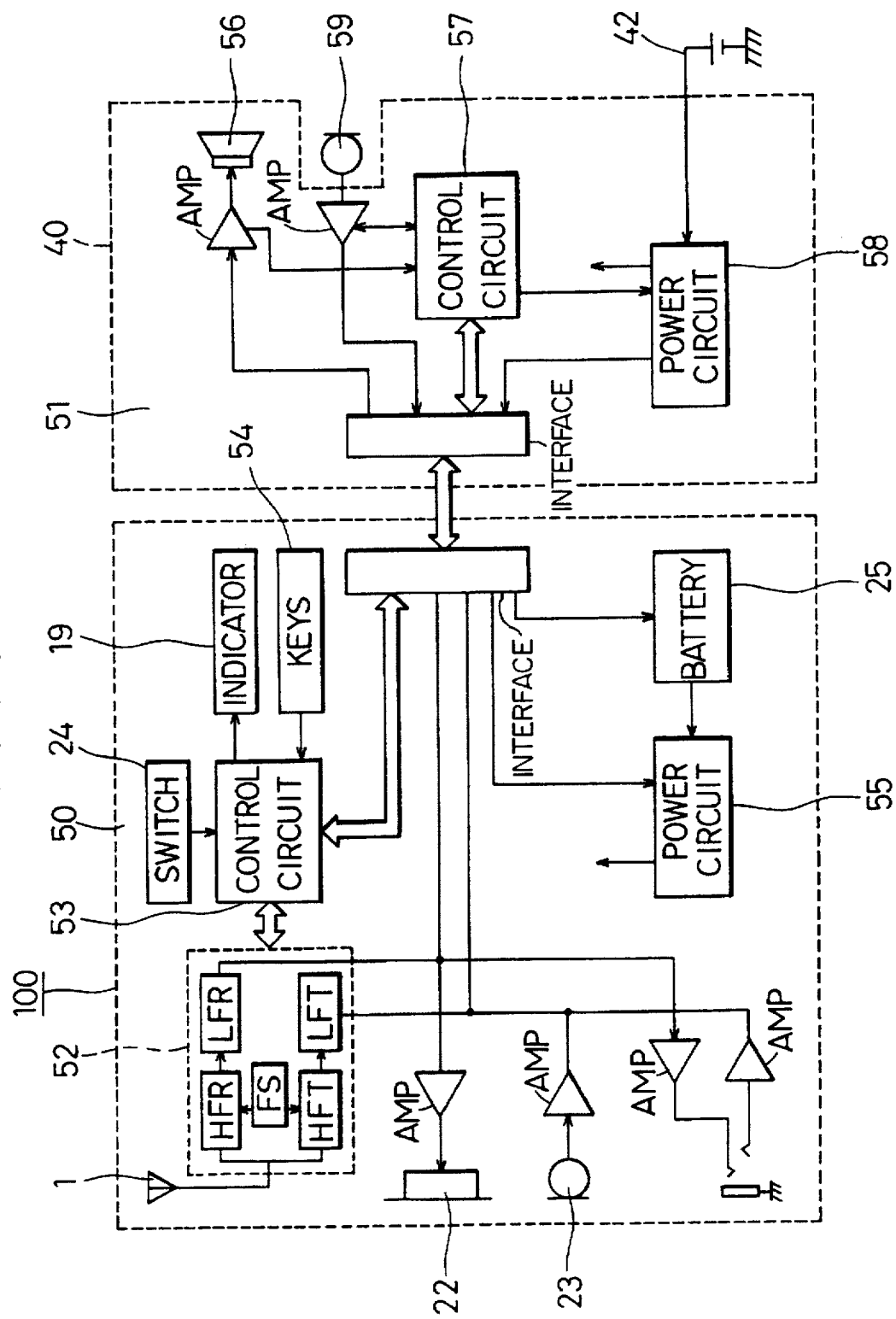
FIG. 7 is a block diagram of the overall electric circuit of the embodiment in the installed position in FIG. 5.

Next, the electric circuit diagram will be described with reference to FIG. 7, in which a cellular telephone side 50 and a cradle side 51, i.e. the adapter side which is mounted on the vehicle are shown.

Within the cellular telephone side 50, installed are the antenna 1, the speaker 22 and the microphone 23 as well as a wireless section 52 connected to the antenna 1, on which a high frequency receiving circuit HFR, a low frequency receiving circuit LFR, a frequency synthesizer FS, a high frequency transmission circuit HFT, a low frequency transmission circuit LFT and the like are installed. Further, a control circuit 53 sends signals to the indicator panel 19 and receives the signals from operation keys 54. The operation keys 54 includes the numeral keys, function keys and the like shown in FIG. 1.

The battery 25 can be connected or disconnected to and from the main unit of the cellular telephone 100 as explained previously, and the power of the battery 25 is supplied to the power supply circuit 55.

Next, a speaker 56 and a control circuit 57 are mounted on the cradle 40 at the cradle side 51. In addition, it is so designed that the power of the vehicle's battery can be supplied from the vehicle's battery to a power circuit 58 via the power cable 42. Further, a hands-free microphone 59, which is installed in the compartment of the vehicle, is connected to the cradle 40.

Figure 8:
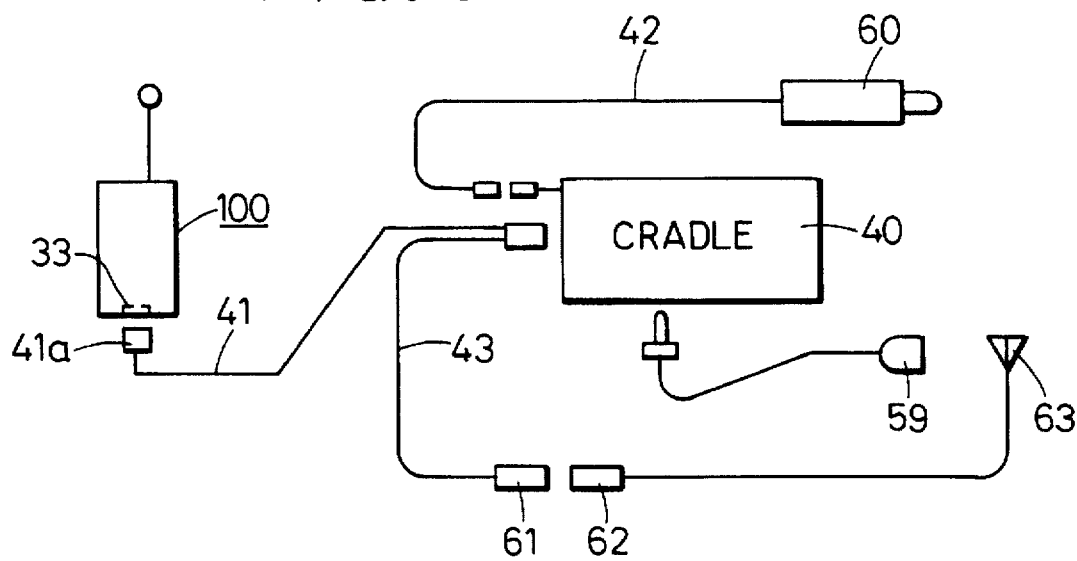
FIG. 8 is a schematic diagram showing the overall wiring connection as connected to the cradle.

FIG. 8 depicts in a schematic diagram such electrical connection for an easy understanding, in which the connector 41a of the cable 41 is designed to be connected to the connector 33 of the cellular telephone 100 and the other end of the cable 41 is connected to the cradle 40. The cradle 40 is designed to receive the power from the vehicle's battery through the power cable 42 via a cigar lighter 60 in the known manner. Further the cradle 40 is so designed that the hands-free microphone 59 can be connected.

The cradle 40 is so designed that the high frequency output can be transmitted to a vehicle's antenna 63 via the power cable 43 which conducts the high frequency signal from the cradle 40 to the antenna 63, through connectors 61 and 62.

Figure 9:
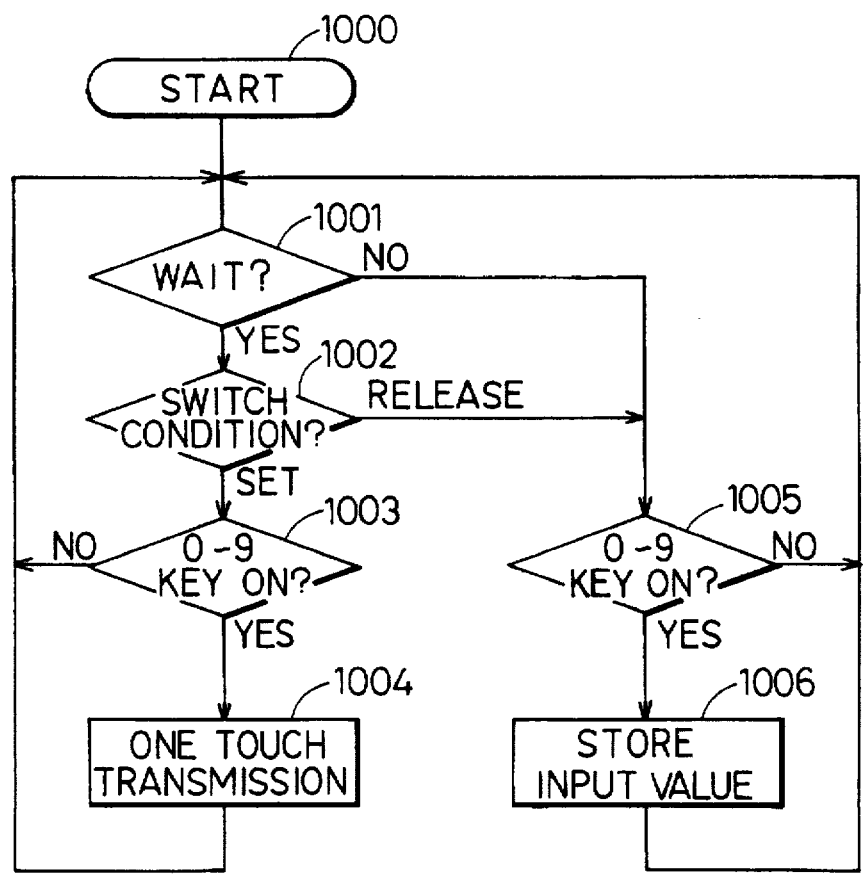
FIG. 9 is a flow chart showing an operation of a control circuit shown in FIG. 7.

Operation of the control circuit 53 of FIG. 7, which employs a microprocessor, is described with reference to a flow chart shown in FIG. 9.

At a step 1000, it is determined at a step 1001 whether the telephone 100 is in a wait condition which means that the power supply is ON and is ready to receive an incoming call from outside.

If the determination is YES, it is then determined at a step 1002 whether the slide switch 24 is slid to the one touch transmission setting mode position. The slide switch 24 is a type in which the slide switch 24 keeps its position once moved until moved to the opposite later. If it is set to the one touch transmission mode and one of numerical keys 3 through 12 is pushed down (ON) at a step 1003, a call signal is transmitted at a step 1004 to a person or location stored beforehand in correspondence to each numerical key, thus performing one touch transmission.

If the slide switch 24 is released from the one touch transmission mode, each time one of the numeral keys 3 through 12 is pushed down (YES) at a step 1005 the numerical value (input value) of the pushed key is stored at a step 1006 to form a series of phone numbers which is to be called.

Next, a case when the cellular telephone 100 is used in the compartment of the vehicle is described. In such occasion, there are provided a pair of mode, that is, the independent mode and the vehicle's antenna connection mode. The independent mode means the state that the cellular telephone 100 shown in FIG. 1 through FIG. 4 is just placed on and held by the cradle 40 as shown in FIG. 5 and the cable 41 is detached. In such state, the battery is charged when the exposed electrodes 28 through 32 (FIG. 2) of the secondary battery 25 of the cellular telephone 100 are connected to the charging electrode at the cradle side (not shown in the figures).

Therefore, when the operator picks up the cellular telephone 100 from the cradle 40 and makes a transmission call to the destination, the wireless output can be transmitted for communication from the antenna 1 relying on the power of the battery 25 attached to the cellular telephone 100.

Next, with regard to the vehicle's antenna connection mode, the cellular telephone 100 and the cradle 40 are connected via the cable 41. In addition, since the cellular telephone 100 is placed on the cradle 40 at the same time, the exposed electrodes 28 through 32 are connected to the electrode at the cradle side so that the battery 25 is charged.

When the operator or user communicates using the cellular telephone 100, the cellular telephone 100 is removed from the cradle 40 for use, and the operation keys are operated for calling with the cable 41 being connected between the cellular telephone 100 and the cradle 40. In such occasion, the cellular telephone 100 receives the power from the vehicle's battery, that is, the battery which supplies the power to operate a vehicle starter for cranking and the like, via the cable 41, the cradle 40 and the power cable 42 and, besides, the transmission output is transmitted as the wireless transmission from the vehicle's antenna 63 (FIG. 8) which protrudes outside the vehicle in place of the antenna 1 of the cellular telephone 100. This will ensure that communcation with a distant location can be performed.

As described above, the cellular telephone can be used in the independent cellular telephone mode when it is brought into the compartment of the vehicle and, since it does not need to be connected to the cable on such an occasion, it will be convenient for those people who use it in the town area only. Further, for those who set out frequently to the suburbs, since the high power output transmission is available via the car telephone, telephone calls can be made by only connecting the cable 41 thereto. The advantage of these two types can be obtained by the same structure of the cellular telephone.

As described above, the cellular telephone can be easily gripped by the operator, and the position of the operation keys of the cellular telephone with the double row construction and the small width dimension can be recognized easily. The microphone and the speaker have a better sound collecting capacity.

Further, the cellular telephone has the feature that the groove is formed from the top of the case to the bottom end continuously running through the front surface of the case. Further, the operation keys have the feature that, when the case is gripped by the left hand with the antenna positioned upright, the operation keys of 0 through 9 are present of the row at the left hand thumb (the left hand side) and the function keys at the other side (the right hand side). Furthermore, it features that at least three small protrusions protruding from the case are provided along the groove and at the vicinity of the operation keys, the small protrusions are arranged in a row from the top end at the antenna side to the bottom end and the small protrusion at the center has a shape different from the other small protrusions to provide a different finger touch.

Further, the cellular telephone is adaptable to the two operation modes, that is, the mode when the cellular telephone can be charged just by placing it on the cradle and is used for the transmission or receiving using the built-in antenna and, the other mode when it can be used like the car telephone with which the high frequency output is conducted to the vehicle's antenna via the cable which picks up the high frequency signals from the cellular telephone, so as to enable the transmission to the distant address.

The present invention which has been described with reference to the embodiments considered presently preferred should not be limited but may be modified in may ways without departing from the spirit of the invention.

What is claimed is:

1. A cellular telephone for use in an automobile including a cradle having a control circuit receiving power from said automobile, a hands-free microphone and a hands-free speaker, said automobile having an antenna mounted thereon comprising:

a built-in battery;

a generally rectangular case, housing said battery, with a rear surface thereof adapted to be placed on a left hand palm when held by a left hand;

a built-in antenna protruding from a top end of said case;

a groove portion, formed longitudinally between a right hand side and a left hand side on a front surface of said case and running from said top end of said case to a bottom end of said case in a longitudinal direction of said case, to provide hilly portions at right and left side portions of said groove portion;

a speaker formed in said groove portion at a top portion of said case close to said built-in antenna;

a microphone formed in said groove portion at a bottom portion of said case away from said built-in antenna;

operation keys arranged in only two rows along a longitudinal direction on a front surface of said case, said operation keys including numerical keys of 0 through 9 in one row at a left hand side when said case is held by a left hand with said built-in antenna at a top position, and function keys having at least keys for transmission and terminating a call at a right hand side of said case, said function keys being disposed on a right hand side of said case in a vicinity of said built-in antenna;

a liquid crystal display, disposed on said front surface of said case on a right hand side of said case on said side of said function keys opposite said built-in antenna and extending in a longitudinal direction on said front surface of said case, for displaying a destination telephone number of a telephone call; and a switch provided on a rear surface of said case in the vicinity of said built-in antenna for enabling a one touch signal transmission setting, said switch being moveable between right and left side positions to a position for one touch signal transmission setting and to another position for a one touch transmission release operation;

wherein said liquid crystal display is further for displaying an indication of said one touch signal transmission setting when said switch is in said position for said one touch signal transmission setting; and when said telephone is mounted in said cradle, said one touch signal transmission setting can be confirmed using said liquid crystal display and a telephone call can be placed by actuating one of said numerical keys; and said telephone is capable of placing and receiving calls using said hands-free microphone and said hands-free speaker when in a hands-free mode and mounted in and connected to said cradle and is capable of placing and receiving calls using said built-in battery and said built-in antenna when held in a palm.

2. A cellular telephone as claimed in claim 1, wherein formed as a row of button switches arranged in a slanted form with its right hand side directed upward.

3. A cellular telephone as claimed in claim 1, further comprising:

three protrusions formed on said groove portion along said numerical keys to designate positions of particular ones of said numerical keys, a middle one of said protrusions having a different shape from the other two of said protrusions to provide a different finger touch sensation.

4. A cellular telephone as claimed in claim 1, wherein said cradle is for charging said built-in battery.

5. A cellular telephone as claimed in claim 4, wherein:

said cradle has electrodes connected to a battery in said automobile;

said telephone has a connector for delivering charging power to said built-in battery; and when said telephone is mounted in said cradle, said cradle electrodes make contact with said connector to deliver said automobile battery power to said built-in battery as said charging power.

6. A cellular telephone as claimed in claim 1, wherein when said telephone is mounted in said cradle, a telephone call can be placed using said built-in antenna when said telephone is in an independent mode.

7. A cellular telephone as claimed in claim 1, wherein said telephone operates off of power from said built-in battery when in said independent mode.

* * * * *